United States Patent [19]
Batson et al.

[11] Patent Number: 6,001,504
[45] Date of Patent: Dec. 14, 1999

[54] PRISMATIC BATTERY HOUSING

[75] Inventors: David C. Batson, Winchester; John D. Sillesky, Franklin; Richard M. Mank, Weymouth, all of Mass.

[73] Assignee: Duracell Inc., Bethel, Conn.

[21] Appl. No.: 09/038,326

[22] Filed: Mar. 11, 1998

[51] Int. Cl.[6] ..................................................... H01M 2/04
[52] U.S. Cl. .......................... 429/163; 429/164; 429/166; 429/171; 429/172; 429/174
[58] Field of Search ..................................... 429/163, 164, 429/166, 171, 172, 174

[56] References Cited

U.S. PATENT DOCUMENTS

| | | |
|---|---|---|
| 3,524,770 | 8/1970 | Wilke . |
| 3,673,000 | 6/1972 | Ruetschi . |
| 3,841,913 | 10/1974 | Anderson . |
| 3,977,907 | 8/1976 | Roth et al. . |
| 4,216,277 | 8/1980 | Uba . |
| 4,309,493 | 1/1982 | Kuhl et al. . |
| 4,374,909 | 2/1983 | Tucholski . |
| 4,433,361 | 2/1984 | Wolf et al. . |
| 4,476,202 | 10/1984 | Wesner . |
| 4,523,376 | 6/1985 | Thibault et al. . |
| 4,537,841 | 8/1985 | Wiacek et al. . |
| 4,632,887 | 12/1986 | Jung . |
| 4,670,362 | 6/1987 | Wiacek et al. ........................... 429/174 |
| 4,700,468 | 10/1987 | Volkhin et al. . |
| 4,822,377 | 4/1989 | Wolff . |
| 4,999,264 | 3/1991 | Shepard, Jr. et al. . |
| 5,041,345 | 8/1991 | O'Hara . |
| 5,051,323 | 9/1991 | Murphy . |
| 5,079,108 | 1/1992 | Annen et al. . |
| 5,080,984 | 1/1992 | Thibault et al. . |
| 5,080,985 | 1/1992 | Wiacek et al. . |
| 5,114,808 | 5/1992 | Chaney, Jr. et al. . |
| 5,150,602 | 9/1992 | Payne et al. . |
| 5,173,379 | 12/1992 | Ichinose et al. . |
| 5,248,568 | 9/1993 | Getz . |
| 5,486,431 | 1/1996 | Tuttle et al. . |
| 5,490,867 | 2/1996 | Kozawa et al. . |
| 5,547,781 | 8/1996 | Blonsky et al. . |
| 5,549,717 | 8/1996 | Takeuchi et al. . |
| 5,652,070 | 7/1997 | Blonsky et al. . |
| 5,658,356 | 8/1997 | Burns . |
| 5,662,718 | 9/1997 | Tuttle . |
| 5,663,013 | 9/1997 | Narukawa et al. ...................... 429/164 |
| 5,665,489 | 9/1997 | Tuttle . |
| 5,667,912 | 9/1997 | Georgopoulos . |
| 5,688,294 | 11/1997 | Mizuno et al. . |
| 5,725,967 | 3/1998 | Tuttle . |

FOREIGN PATENT DOCUMENTS

| | | |
|---|---|---|
| 2 324 254 | 5/1973 | Germany . |

*Primary Examiner*—Maria Nuzzolillo
*Assistant Examiner*—Angela J. Martin
*Attorney, Agent, or Firm*—Fish & Richardson P.C.

[57] ABSTRACT

The invention features a prismatic battery with an electrically conductive housing comprising an elongated, prismatic can with an open end, and a housing cover pressed into the open end of the can and welded in place. The novel cover has an outer flange about its periphery, extending generally in the direction of extension of the sides of the can, which elastically deflects as the cover is pressed into the can to provide good contact for welding. The cover has two raised bumps forming internal pockets that are part of the internal volume of the cell. The bumps are also arranged to prevent rotation of the seal/vent assembly. One embodiment includes a plugged fill hole in one of the bumps. Corresponding methods of manufacture are also disclosed.

17 Claims, 3 Drawing Sheets

PRISMATIC BATTERY HOUSING

BACKGROUND OF THE INVENTION

This invention relates to batteries with prismatic housings, and their construction.

Prismatic cells are prismatic rather than circular in cross-section. Examples of such prismatic cells include rechargeable F6 nickel metal hydride (NiMH) cells currently used in portable electronics equipment, such as cellular phones, which have rectangular cross-sections. The housings of such prismatic cells typically include a deep drawn (or longitudinally seamed) can which is capped with a rigid, flat plate cover assembly having one or more electrical contacts. The cover is typically pressed down into the prismatic, open end of the can until the upper edge of the cover is slightly below the upper edge of the can, and then welded in place (e.g., by laser welding) to seal the cell. Housing materials include stainless steel or nickel plated cold rolled carbon steel (CRS).

Precise tolerancing of the can and cover are required to provide intimate contact about the entire periphery of the cover for a good seal upon welding. Ideally, the parts are dimensioned line-to-line or for a slight interference fit in order to avoid gaps along the weld seam. If the interference is excessive, the flat plate cover can buckle, typically through the hole or holes punched through it for the contact/vent assemblies. If the cover bends significantly, the seal at these holes is compromised. If there is an excessive local gap between the cover and can, obtaining a hermetic laser weld will be difficult, due in part to the lack of filler material used in the welding process. These concerns may be addressed by requiring extremely tight dimensional tolerances on critical can and cover dimensions, thus increasing the cost of the components. Some current F6 designs employ overall can tolerances of +/−0.002 inch (0.05 millimeter), for instance, which can be difficult to reliably, economically achieve with deep drawing.

The contact/vent assemblies are typically mounted in round holes punched through the flat plate cover, electrically isolated from and sealed to the cover with a polymeric seal. During manufacture and in use, care must be taken to avoid rotating the contact/vent assemblies within their mounting holes, which can cause internal shorting.

Particularly with thin cells, such as the common F6 prismatic cell, care must be taken not to damage or distort the seal material at the contact/vent assembly during the welding process, due to the close proximity of the edge of the seal to the weld seam. Limiting the heat in the area near the seal can reduce the distortion of the seal and reduce the reject rate due to leakage at the seal, but can also result in a higher reject rate due to leakage at the seam.

Many standard prismatic cell sizes, such as the F6, require a specific height of their contacts relative to the edge of the open end of their cans. After the cover is welded in place, spacers are sometimes added between the cover and the outer contact to control this dimension. Ideally, the covers are precisely positioned as far outward as possible to provide the most internal cell volume for active materials.

SUMMARY OF THE INVENTION

The invention provides a prismatic housing cover construction that can effectively reduce the sensitivity of the sealing process to cover/can dimensional tolerances, can enable the use of higher welding heat without seal damage, and can provide, in some embodiments, additional internal cell volume and seal rotation prevention through the use of raised cover portions.

The invention features a prismatic cell housing cover with an outer flange about its periphery, extending generally in the direction of extension of the sides of the can.

According to one aspect of the invention, a prismatic battery includes an electrically conductive housing having a prismatic can and a housing cover. The can has an open end defined between extending, opposing sides of the can, and the housing cover is located between and sealed against the opposing sides at the open end of the can, such that the can and cover together enclose a volume. The cover has an outer flange about its periphery, the flange extending generally in the direction of extension of the sides of the can, the flange and can sides together defining a welded seam at the distal edge of the flange.

Preferably, the cover has a raised portion forming an internal pocket in hydraulic communication with the enclosed volume, to provide additional internal cell volume for active materials and/or electrolyte.

The battery may be very thin for particular applications. For instance, in presently preferred embodiments the prismatic can has a minimum dimension between opposing sides at the open end of less than about 6.0 millimeters. In the illustrated embodiments, this dimension is about 5.0 millimeters.

Various embodiments of the invention may contain one or more of the following features. The cover is of stamped metal. The cover is rectangular with radiused corners. The cover flange is tapered outward to provide pressure between the flange and the sides of the housing can. The raised portion has a fill hole through the cover, with a plug (e.g., a metal ball) placed within and sealing the fill hole.

In some embodiments the cover defines a hole therethrough, and the battery includes an external electrical contact attached to the cover at the hole. A seal between the contact and the cover electrically insulates the contact from the cover. In some instances, the raised portion is arranged to engage the seal to prevent the rotation of the seal with respect to the cover. The cover has, in one embodiment, two such raised portions, the seal located between and constrained against rotation by the two raised portions.

Preferably, the height of the flange in the direction of extent of the sides of the can is at least three times the nominal thickness of the cover.

According to another aspect, the invention provides a method of constructing a battery with an electrically conductive prismatic battery housing. The method includes the steps of: (a) pressing a housing cover (having an appropriate flange, as described above) into the open end of an elongated, prismatic can to enclose a volume; and (b) welding the seam to seal the cover to the can.

The step of welding may be performed, for instance, by directing a laser beam at the seam in the direction of extent of the sides of the can.

Typically, the step of pressing includes resiliently deflecting the sides of the can outward at the open end of the can.

In some cases the raised portion has a fill hole (as described above), the method further including, after welding, the steps of (c) adding electrolyte to the enclosed volume through the fill hole; and (d) plugging the fill hole to seal the enclosed volume. Before plugging, an elevated test pressure may be applied to the enclosed volume through the fill hole.

Other features and advantages will be apparent from the following description of embodiments of the invention, and from the claims.

DESCRIPTION OF EMBODIMENTS

Figure 1:
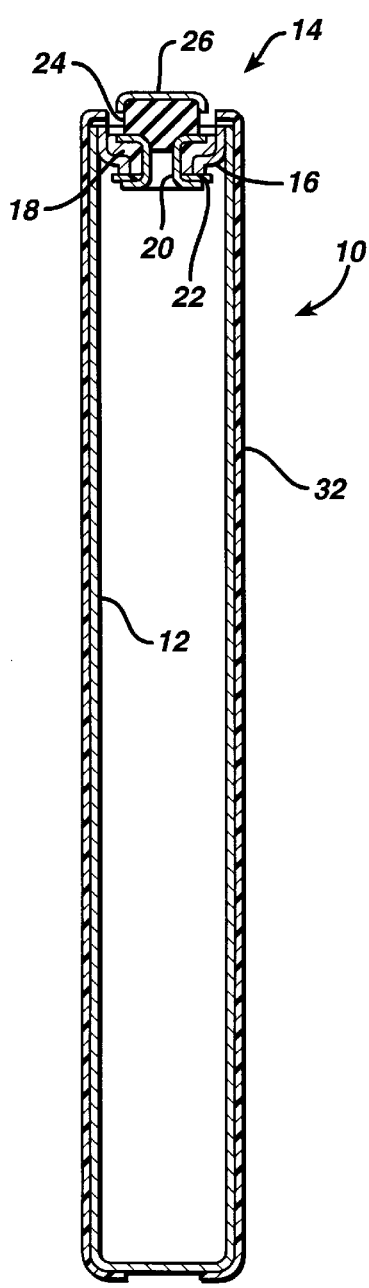
FIGS. 1 and 2 are orthogonal, longitudinal cross-sections through a prismatic cell housing.
Figure 2:
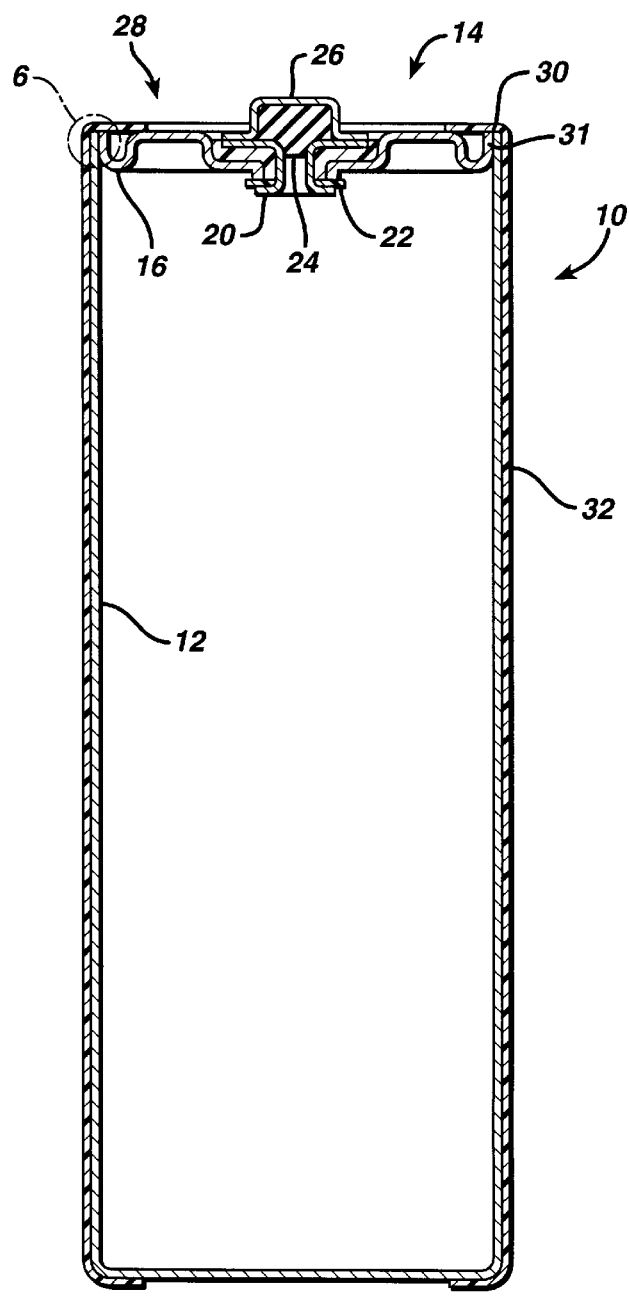

Referring to FIGS. 1 and 2, an F6 prismatic cell 10 has a housing assembly including a deep drawn, nickel plated CRS can 12 and a cover assembly 14. The internal components of the cell are not shown, but are typical of standard F6 cells, and include at least two electrodes. Cover assembly 14 includes a stamped nickel plated CRS cover 16, a plastic vent seal 18, a metal rivet 20, a washer 22, a vent plug 24 and a metal contact (pip) 26. During assembly, cover 16 is pressed down into the open end 28 of can 12 and welded about the entire length of its periphery along seam 30 to seal the cover to the can. An outer insulator 32 of heat-shrinkable material is placed over the housing after assembly.

Figure 3:
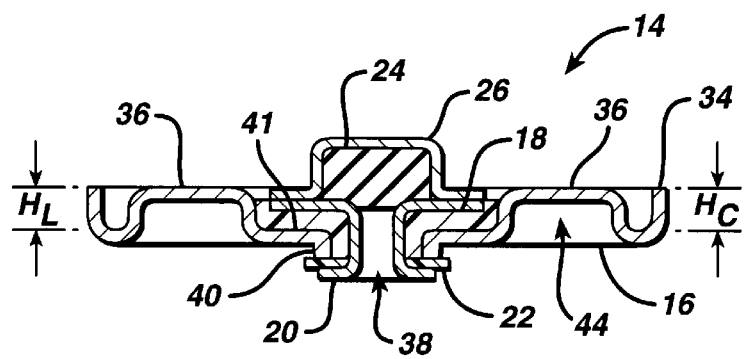
FIG. 3 is an enlarged view of the cover assembly of FIG. 2.
Figure 4:
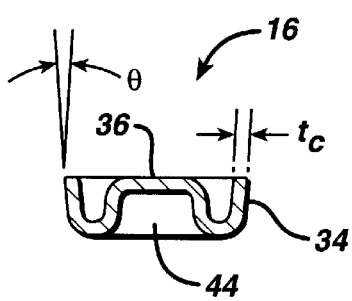
FIG. 4 is a cross-section of the cover, taken along line 4—4 of FIG. 5.

Referring to FIGS. 3 and 4, cover 16 has a nominal thickness $t_c$ of about 0.33 millimeter, and, as stamped to an overall height $H_c$ of 1.62 millimeters, has a peripheral lip 34 that extends toward one broad side of the cover. Lip 34 has a lip height $H_L$ of about 1.3 millimeters. Also stamped into the cover are two raised bumps 36, one on either side of the hole 38, which is punched through the cover at its center. Hole 38 may be punched through the cover blank from its outer side, prior to forming the lip and bumps. By punching the hole from the outer side of the cover, a ridge 40 is formed at its inner side and the outer surface 41 remains flat for sealing. The punching operation further provides a radius at the edge of the hole at the outer side of the cover to assist with the insertion of seal 18. Rivet 20 is inserted through the seal, washer 22 is set in place, and the smaller, inner flange of the rivet is formed to hold the rivet, seal and washer in place. Vent plug 24 and pip 26 are set in place and the pip is spot welded to the larger, outer flange of rivet 20. As assembled, seal 18 and washer 22 electrically insulate the rivet and pip from the cover, as the cover is in electrical communication with the cell anode and the pip is in electrical communication with the cell cathode. Lip 34 is tapered outward at an angle θ of about 2.5 degrees, providing secure engagement with the inner surfaces of the housing can, as discussed below with respect to FIG. 6.

Figure 5:
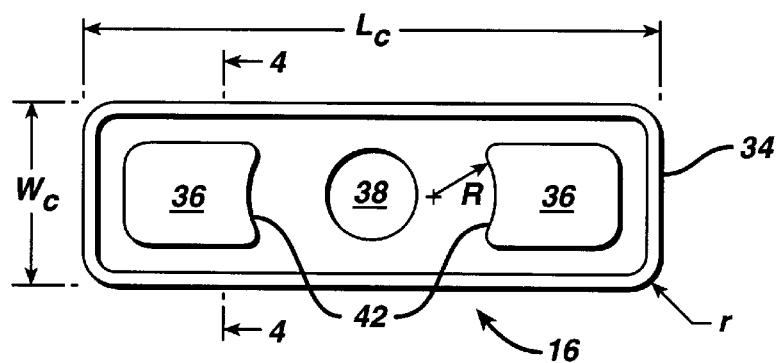
FIG. 5 is a top view of the cover.
Figure 8:
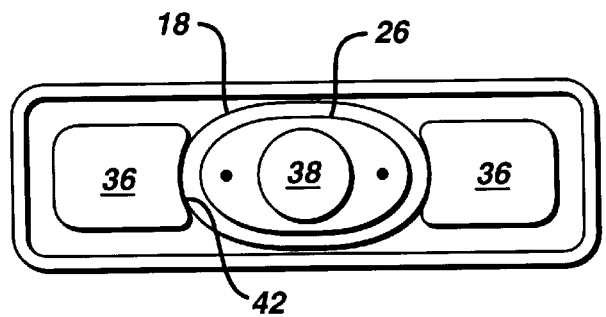
FIG. 8 is a top view of the cover assembly shown in cross-section in FIG. 3.

As shown in FIG. 5, the sides 42 of raised bumps 36 facing vent assembly mounting hole 38 are arcuate, having a radius, R, of about 2.2 millimeters. These curved sides 42 restrain the oval vent assembly (rivet 20 and everything in contact with it) from rotating in hole 38 after assembly of the seal and pip to the cover, as shown in FIG. 8. In addition to preventing rotation of the seal and vent, bumps 36 form cavities 44 (FIG. 4) on the inner side of the cover, which provide additional internal cell volume. Bumps 36 and lip 34 also increase the bending stiffness of the cover, which has finished overall dimensions $W_c$ and $L_c$ of about 5.0 and 15.8 millimeters, respectively, slightly larger than the corresponding dimensions between opposing sides of the can at its open end. The four corners of cover 16 have an outer radius, r, of about 0.75 millimeter to match a similar inner radius at the corners of the opening of the can.

Figure 6:
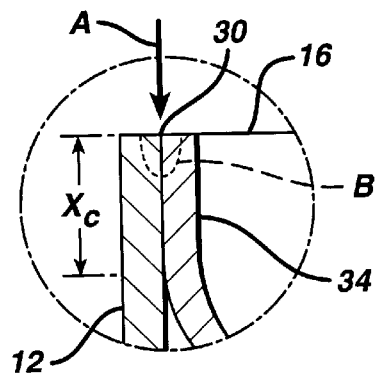
FIG. 6 is an enlarged view of area 6 in FIG. 2, without insulator 32.

Referring to FIG. 6, outwardly tapered lip 34 of cover 16 is elastically deflected inwardly as the cover is pressed into the open end of can 12, while the sides of the can are deflected outwardly. These elastic deflections provide a contact load between the can and cover to ensure a tight fit at seam 30, even with relatively high dimensional tolerances. For instance, can 12 can be drawn with a 0.25 degree side draft angle and an opening tolerance of +/−0.004 inch (0.1 millimeter) in each dimension while maintaining reliable press fits. Pressed into place, the cover contacts the inner surface of can 12 along a length $X_c$ of about 0.6 millimeter (preferably, about three times the heavier wall thickness of the two adjoining walls). After the cover is pressed into the can until the edge of lip 34 is flush with the edge of can 12 as shown, the cover and can are welded together by a laser directed at seam 30 in the direction of arrow A, producing a melt zone shown by dashed line B and sealing the seam. The laser beam travels along the length of seam 30 (either the cell or the laser may be physically moved) to complete the weld.

Figure 7:
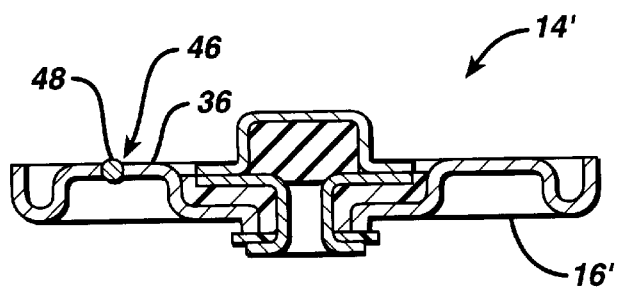
FIG. 7 illustrates a second embodiment, with a plugged fill hole through a raised portion of the cover.

Referring to FIG. 7, a second embodiment 14' of the cover assembly has a cover 16' with a plugged fill hole 46 in one of the raised bumps 36. The fill hole is employed to pressure test and fill the cell with electrolyte after welding cover assembly 14' to the can, and is subsequently plugged with a stainless steel ball 48 (e.g., of about 1.6 millimeters in diameter) which is welded in place by laser or TIG welding.

Other embodiments are also within the scope of the following claims.

What is claimed is:

1. A prismatic battery having an electrically conductive housing comprising
   a prismatic can having an open end defined between extending, opposing sides of the can; and
   a housing cover disposed between and sealed against the opposing sides at the open end of the can, the can and cover together enclosing a volume, the cover having an outer flange about its periphery, the flange when disposed between the opposing sides of the can extending in the direction of extension of the sides of the can and defining therewith a welded seam.

2. The prismatic battery of claim 1 wherein the cover has a raised portion defining therein a pocket in hydraulic communication with the enclosed volume.

3. The prismatic battery of claim 1 wherein the prismatic can has a minimum dimension between opposing sides at the open end of less than about 6.0 millimeters.

4. The prismatic battery of claim 1 wherein the cover is of stamped metal.

5. The prismatic battery of claim 1 wherein the cover is rectangular with radiused corners.

6. The prismatic battery of claim 2 wherein the cover defines a hole therethrough, the battery further comprising
   an external electrical contact attached to the cover at the hole; and
   a seal disposed between the contact and the cover to electrically insulate the contact from the cover.

7. The prismatic battery of claim 6 wherein the raised portion is arranged to engage the seal to prevent the rotation of the seal with respect to the cover.

8. The prismatic battery of claim 7 comprising two said raised portions, the seal disposed between and constrained against rotation by the two raised portions.

9. The prismatic battery of claim 1 wherein the cover flange is tapered outward to provide pressure between the flange and the sides of the housing can.

10. The prismatic battery of claim 2 wherein the raised portion defines therethrough a fill hole, the battery further comprising a plug disposed within and sealing the fill hole.

11. The prismatic battery of claim 10 wherein the plug comprises a metal ball.

12. The prismatic battery of claim 1 wherein the height of the flange in the direction of extent of the sides of the can is at least three times the nominal thickness of the cover.

13. A method of constructing a battery with an electrically conductive prismatic battery housing, the method comprising pressing a housing cover into the open end of an elongated, prismatic can to enclose a volume, the open end being defined between extending, opposing sides of the can, the cover having an outer flange about its periphery, the flange when pressed into the can extending in the direction of extension and defining therewith a seam, the cover having a raised portion defining therein a pocket in hydraulic communication with the enclosed volume; and welding the seam to seal the cover to the can.

14. The method of claim 13 wherein the step of welding comprises directing a laser beam at the seam in the direction of extent of the sides of the can.

15. The method of claim 13 wherein the step of pressing includes resiliently deflecting the sides of the can outward at the open end of the can.

16. The method of claim 13 wherein the raised portion defines therethrough a fill hole, the method further comprising, after welding, adding electrolyte to the enclosed volume through the fill hole; and plugging the fill hole to seal the enclosed volume.

17. The method of claim 16 further comprising, before plugging, applying an elevated test pressure to the enclosed volume through the fill hole.

* * * * *